Patented Aug. 8, 1933

1,921,293

UNITED STATES PATENT OFFICE 1,921,293

PRODUCT AND PROCESS OF REACTING CASHEW NUT SHELL LIQUID WITH PARAFORMALDEHYDE

Mortimer T. Harvey, East Orange, N. J., assignor to The Harvel Corporation, Newark, N. J., a Corporation of New Jersey No Drawing. Application February 22, 1929
Serial No. 341,862

12 Claims. (Cl. 260—3)

The present invention relates to products of reaction or compositions of matter made with cashew nut shell liquid and metaformaldehyde, with or without other materials; and the invention also relates to methods, processes and steps for producing the reaction products and compositions of the invention. The products and compositions of this invention are useful in making paints, varnishes, electrical insulation, coatings, molded compositions, oil and steam gaskets, and other products, and are useful in the arts generally.

The metaformaldehyde and cashew nut shell liquid can be poured together, or run through a mixer, or ground together in a ball mill to get a thorough and uniform intermixture, and these materials are suitable for intermixture in other ways.

Metaformaldehyde of the trade, commonly known as paraform, is suitable for use in practicing this invention, the finely powdered form being advantageously used because of the facility with which it can be intermixed with the cashew nut shell liquid. Hereinafter, in this specification, the metaformaldehyde will be referred to as paraform, and the cashew nut shell liquid will be referred to as Cnsl.

The two materials, Cnsl and paraform, react together at normal or room temperatures with a resulting thickening or condensation due to the reaction or interaction of the two materials. The paraform and Cnsl can be reacted in a solvent as by bringing them together in ordinary solvent vehicles such as benzol, gasoline, varnoline, kerosene, naptha and the like.

The rate of reaction can be increased by use of heat applied to the mixture of paraform and Cnsl, and also by preheating the Cnsl before mixing it with the paraform; and this is the case when the preheated Cnsl has been cooled before mixing with the paraform and is used at normal temperatures or at temperatures below or above that of the preheating. The range of preheating temperatures effective for increasing the rate of reaction extends from just above normal to the highest temperatures the Cnsl will stand, and a practical range, as an example, is from 200° F. to 600° F. or 700° F. At the lower temperatures the amount of increase in rate of reaction varies perceptibly with the length of time of preheating, but when the higher temperatures of the range are involved it is sufficient for many purposes that the Cnsl is brought to the temperature desired or predetermined and then cooled.

In making molded and other compositions fillers of such materials as lead oxides, zinc oxides, iron oxides, barytes, lime asbestos, slate dust, wood flour and so on can be used.

As an example of a dipping or coating material the following is given. Commercial Cnsl is heated to about 600° F. to drive off any water which may be present and to render the Cnsl more reactive; the Cnsl is then dissolved in benzol, xylol, gasoline, varnolene, or naptha, about equal volumes of Cnsl and solvent; about two per cent of paraform by weight with respect to the Cnsl is then added to the solution. Electric coils, fabrics, paper, cloth, etc., or other objects or materials are then dipped in or otherwise coated with the solvent mixture and dried at about 285° F. at which temperature the solvent is driven off and the reaction product is set and hardened in about thirty minutes.

As an example of a molding composition of the invention the following is given. Cnsl was brought up to 550° to 600° F. and cooled to room temperature and one hundred parts thereof by weight were mixed with ten parts of paraform. Three of this mixture by weight and two parts of wood flour were mixed together in a bread mixer and molded and cured at 285° F. for about five hours. The curing can be done in or out of the mold. The same Cnsl-paraform was used in making rolled laminated tubing of paper to secure the successive layers to each other and the tubes were cured at 240° F. for about sixteen hours.

The time of curing can be lessened by increasing the temperature or increasing the proportions of paraform to Cnsl used; and these proportions can be higher than those cited, for example, fifteen to twenty parts of paraform to one hundred parts of Cnsl.

To suit different conditions and purposes, changes can be made in any of the examples above given, whether generally referred to or particularly described, by adding various materials as loaders or fillers or to secure certain modifications, within the skill of one having knowledge of the art and without departing from the scope of the present invention. Such materials are gum waxes; and resins such as copal, coumarone, and so on; vegetable, mineral, and animal pitches; drying oils such as linseed oil, China-wood oil, fish oil, and so on.

The compositions of the invention are suitable for making coatings; impregnations; molded compositions; and laminated bodies of paper, cloth, wood, and so on in tubing, flat and other forms; and for use in the arts generally. The finished products of reaction of cashew nut shell liquid and metaformaldehyde are insoluble in common solvents such as gasoline, benzol, petroleum spirits and oils; are unaffected by water or steam; are not softened by heat, rather they set further if anything.

What I claim is:—

1. The method of making a composition of matter which comprises reacting cashew nut shell liquid with paraformaldehyde.

2. The method of making a composition of matter which comprises heating cashew nut shell liquid to above 100° F., cooling the same, and reacting it with paraformaldehyde.

3. The method of making a composition of matter which comprises heating cashew nut shell liquid to above 100° F., and reacting it with paraformaldehyde.

4. The method of making a composition of matter which comprises heating cashew nut shell liquid to above 500° F., cooling the same, and reacting it with paraformaldehyde.

5. The method of making a composition of matter which comprises heating cashew nut shell, liquid to about 600° F., cooling the same, and reacting it with paraformaldehyde.

6. The method of making a composition of matter which comprises subjecting cashew nut shell liquid to the action of paraformaldehyde with the aid of heat.

7. A composition of matter obtained by reacting cashew nut shell liquid and paraformaldehyde.

8. A composition of matter obtained by heating together cashew nut shell liquid and paraformaldehyde.

9. A composition of matter obtained by heating cashew nut shell liquid above 100° F., and reacting with paraformaldehyde.

10. A composition of matter obtained by heating cashew nut shell liquid above 500° F. and reacting with paraformaldehyde.

11. A composition of matter obtained by reacting cashew nut shell liquid with paraformaldehyde at a temperature above 100° F.

12. The method of making a composition of matter which comprises subjecting cashew nut shell liquid to reaction with paraformaldehyde, with the aid of heat at above 100° F.

MORTIMER T. HARVEY.